United States Patent
Lin

(10) Patent No.: US 12,088,533 B2
(45) Date of Patent: Sep. 10, 2024

(54) METHOD OF INTERLACE STRUCTURE CONFIGURATION IN A WIDEBAND SYSTEM

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 367 days.

(21) Appl. No.: 17/715,525

(22) Filed: Apr. 7, 2022

(65) Prior Publication Data

US 2022/0231822 A1    Jul. 21, 2022

Related U.S. Application Data

(63) Continuation of application No. PCT/IB2019/001172, filed on Oct. 7, 2019.

(51) Int. Cl.
*H04L 5/00* (2006.01)
*H04W 72/0453* (2023.01)
*H04L 27/26* (2006.01)

(52) U.S. Cl.
CPC .......... *H04L 5/0092* (2013.01); *H04L 5/0094* (2013.01); *H04W 72/0453* (2013.01); *H04L 27/26025* (2021.01)

(58) Field of Classification Search
CPC . H04L 5/0092; H04L 5/0094; H04W 72/0453
See application file for complete search history.

(56) References Cited

U.S. PATENT DOCUMENTS

| | | | |
|---|---|---|---|
| 2020/0028740 A1* | 1/2020 | Kim | H04L 41/0895 |
| 2021/0399858 A1* | 12/2021 | Yang | H04L 5/001 |
| 2022/0124701 A1* | 4/2022 | Yang | H04W 72/0453 |
| 2022/0150008 A1* | 5/2022 | Schober | H04W 72/02 |

(Continued)

OTHER PUBLICATIONS

The first Office Action of corresponding European application No. 19818246.1, dated Jul. 22, 2022.

(Continued)

*Primary Examiner* — Kevin C. Harper
(74) *Attorney, Agent, or Firm* — Ladas & Parry LLP

(57) ABSTRACT

The disclosure is related to a method for configuring an interlace structure in a wideband system, performed by a user equipment, wherein the wideband system comprises a bandwidth part containing a plurality of subbands (N; SB0, SB1), each subband (SB) being formed by resource blocks (RB), the method comprises the steps of: —obtaining for each SB within the BWP, at least two structure indications; —obtaining a subcarrier spacing indication related to the subcarrier spacing; —obtaining at least one interlace index indication related to one location of an RB of interlace index i-th; —configuring the interlace structure; and —for each SB, by determining a set of AV-RB starting from the starting AV-RB and containing a number of consecutive RB corresponding to the pre-defined number (T) of RB forming an interlace; and determining a set of potential-valid RB (PV-RB) as all RB other than the determined AV-RB.

20 Claims, 7 Drawing Sheets

(56) References Cited

U.S. PATENT DOCUMENTS

2022/0167404 A1* 5/2022 Park .................. H04W 16/14
2022/0295452 A1* 9/2022 Tsai .................. H04W 72/21

OTHER PUBLICATIONS

International Search Report (ISR) dated Jun. 12, 2020 for Application No. PCT/IB2019/001172.
ZTE, Sanechips, 3GPP TSG RAN WG1 Meeting #98 R1-1908209; Discussion on Wide-band operation for NR-U, Prague, CZ, Aug. 26-30, 2019.
Qualcomm Incorporation:"UL signals and channels for NR-U", 3GPP Draft; R1-1911096 7.2.2.1.3 UL Signals and Channels for NR-U, 3rd Generation Partnership Project (3GPP), Mobile Competence Centre; 650, Route Des Lucioles; F-06921 Sophia-Antipolis Cedex; France, vol. RAN WG1, No. Chongqing, CN: Oct. 14, 2019-Oct. 20, 2019 Oct. 5, 2019(Oct. 5, 2019, XP051808835.
VIVO:"Discussion on physical UL channel design in unlicensed spectrum", 3GPP Draft; R1-1812299 Discussion on Physical UL Channel Design in Unlicensed Spectrum, 3rd Generation Partnership Project (3GPP), Mobile Competence Centre; 650, Route Des Lucioles; F-06921 Sophia-An, vol. RAN WG1, No. Spokane, US; Nov. 12, 2018-Nov. 16, 2018 Nov. 11, 2018(Nov. 11, 2018), XP051554204.
LG Electronics:"Summary #2 on wide-band operation for NR-U", 3GPP Draft; R1-1907769, 3rd Generation Partnership Project (3GPP), Mobile Competence Centre; 650, Route Des Lucioles; F-06921 Sophia-Antipolis Cedex; France, vol. RAN WG1, No. Reno, USA; May 13, 2019-May 17, 2019 May 16, 2019(May 16, 2019), XP051740042.
OPPO:"Consideration on UL signals and channels for NR-U", 3GPP Draft; R1-1812800, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 2018 Nov. 11, 2018(Nov. 11, 2018), XP051554760.

* cited by examiner

METHOD OF INTERLACE STRUCTURE CONFIGURATION IN A WIDEBAND SYSTEM

CROSS-REFERENCE TO RELATED APPLICATIONS

This application is a continuation of International Application No. PCT/IB2019/001172, filed on Oct. 7, 2019, entitled "A METHOD OF INTERLACE STRUCTURE CONFIGURATION IN A WIDEBAND SYSTEM", the content of which is incorporated herein by reference in its entirety.

TECHNICAL FIELD

The present disclosure relates to the field of communication technologies in unlicensed spectrum, and in particular, to a method for a user equipment to transmit a physical uplink control channel in a wireless communication system supporting an unlicensed band and apparatuses supporting the same.

The communication technology is for example a 5G (fifth generation) network using the 5G NR (New Radio) as radio access technology (RAT) defined by 3rd generation partnership project (3GPP). The present disclosure is applicable to 5G NR-U (NR in unlicensed spectrum).

BACKGROUND

According to the NR specification Release 15 (NR R15, 3GPP TS 38.213), the UE reports uplink control information (UCI) in a physical uplink control channel (PUCCH).

Unlicensed Band

The unlicensed band or spectrum is a shared spectrum. The communication equipment in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a devices successfully occupies the channel, the transmission duration cannot exceed the Maximum Channel Occupancy Time (MCOT).

NR-U PUCCH Interlace

In the unlicensed band in 5G Hz, the regulation imposes that if a transmitter wants to operate transmission in the channel, the transmission has to occupy at least 80% of the channel bandwidth. With this restriction in mind, NR-U decided to adopt an interlaced structure for two uplink channel transmissions, they are PUCCH and physical uplink share channel (PUSCH). Each interlace structure will have specific number of physical resource block (PRB). Between each consecutive PRB pairs, there is M PRB further apart. For example, in a 20 Mhz bandwidth and for 30 Khz subcarrier spacing case, 1 interlace has 10 or 11 PRBs and M=5 as shown in FIG. 1.

Wideband Operation

In NR-U wide-band (WB) operation, BS and UE can operate in a wider band which consists of multiple subbands. As NR Rel.15 has defined bandwidth part (BWP) concept, thus in the context of NR-U WB operation, a UE can be configured with an active BWP which contains multiple subbands (SB). However, by regulation, prior to each transmission in the SB, the sender needs to perform LBT. This implies that for multiple SB transmissions, SB-based LBT has to be performed. Since the outcome of the multi-SB LBT cannot be uniform, partial transmission within the active BWP will become a common case.

Problem Statement

In uplink communication, since the UE has no more indication, it is key to determine how to configure the subbands (SB) and interlaces in the BWP. Moreover, how does the UE determine the interlace structure as well as the resource allocation is also key.

SUMMARY

A first object of the present disclosure is a method for configuring an interlace structure in a wideband system, performed by a user equipment, wherein the wideband system comprises a bandwidth part (BWP) containing a plurality of subbands (N; SB0, SB1), each subband (SB) being formed by resource blocks (RB), the method comprises the steps of:

obtaining for each SB within the BWP, at least two structure indications related to two structure parameters out of the three following structure parameters:
a starting subband RB (SS-RB) defined as the first RB of a subband;
a guardband (GB) defined as one or several consecutive RB starting from the SS-RB;
a starting always-valid RB (AV-RB) defined as the first RB after the guardband ends;
obtaining a subcarrier spacing indication related to the subcarrier spacing defining a pre-defined number (T) of RB forming an interlace and an interlace spacing (M) between two RB with a same interlace index;
obtaining at least one interlace index indication related to one location of an RB of interlace index i-th, i being either pre-defined or indicated with the location;
configuring the interlace structure by:
determining all interlaces within the BWP based on the at least one interlace index indication and the subcarrier spacing indication;
and, for each SB, based on the at least two structure indications, by:
determining a set of AV-RB starting from the starting AV-RB and containing a number of consecutive RB corresponding to the pre-defined number (7) of RB forming an interlace;
determining a set of potential-valid RB (PV-RB) as all RB other than the determined AV-RB.

In an embodiment, for determining a set of AV-RBs for N subbands, the AV-RBs of a concerned subband are determined such that, for the concerned subband among N subbands, counting consecutive T RBs starting from the next RB index to the last GB RB index of the concerned subband (last GB RB index+1), where T is a pre-defined integer, depending on the subcarrier spacing of the system; or T is an integer configured by network via RRC.

In an embodiment, the indication related to the SS-RB is the SS-RB position for each SB or the SS-RB position for a first SB within the BWP along with a duration indication of the SB contained in the BWP. In an embodiment, for obtaining the N positions as the starting RB positions of N subbands, there can be indicated by RB index within BWP, or respectively, by firstly indicating a second position as the starting RB position of the first subband (SB0). Then the rest (N−1) positions can be derived from the second position and a gap between the position of the concerned subband and the second position. The gap, which can be indicated in terms of RB numbers, is configurable by RRC or pre-defined, and N is an integer configured by the network.

In an embodiment, the indication related to the guardband (GB) is the guardband duration corresponding to a number of consecutive RB, for each SB. The GB duration can be different for different subbands. The GB of concerned subband starts from the starting RB position of the concerned subband.

In an embodiment, the indication related to the starting AV-RB is the AV-RB position for each SB or the AV-RB position for a first SB within the BWP along with a duration indication of the SB contained in the BWP.

In an embodiment, the interlaces are defined within the BWP across all contained subbands (N; SB0, SB1) and the at least one interlace index indication is a single interlace index indication corresponding to one location of an RB of interlace index i-th within the BWP. In an embodiment, the interlace index indication is the position of the first RB of the interlace index 0. As an example, the first RB position can be indicated by the network via RB index within BWP; or can be a pre-defined RB index, e.g. the first RB index of BWP.

In an embodiment, determining the interlaces over the BWP comprises
  determining the first interlace index (#0) by counting from the first RB position up to the last RB position of the BWP, once every M RBs, where M is a pre-defined integer, depending on the subcarrier spacing of the system; or M is an integer configured by network via RRC; and
  determining the rest of the (M−1) interlace index such that for 1-th interlace index (i=1 . . . M−1), counting from (the first position+i) up to the last RB of the BWP, once every M RBs.

In an embodiment, the interlaces are defined within a subband and the at least one interlace index indication contains two interlace index indications:
  a first interlace index indication corresponding to one location of an RB of interlace index i-th within one SB; and
  a second interlace index indication corresponding to an offset between the first interlace index indication location and the SS-RB of the corresponding SB.

In an embodiment, within one specific SB, the set of PV-RB is defined as all RB other than the determined AV-RB from the SS-RB of the specific SB to the SS-RB of the next SB to the specific SB.

In an embodiment, for determining a set of PV-RBs for N subbands, the PV-RBs of the concerned subband (subband index m) are determined as all the RBs, other than the AV-RBs, from the starting RB position of the concerned subband up to the last RB before the starting RB position of the next subband index (subband index (m+1)).

A second object of the present disclosure is a method for allocating frequency resources in a wideband system, performed by a user equipment, wherein the wideband system comprises a bandwidth part (BWP) containing a plurality of subbands (N; SB0, SB1), each subband (SB) being formed by resource blocks (RB), the method comprises the steps of:
  configuring an interlace structure according to the first object;
  obtaining at least one interlace index (#i) and at least one SB index (SBj);
  determining the frequency resources based on the at least one interlace index, the at least one SB index and the interlace structure, such that:
    if the at least one subband index corresponds to a single SB, the allocated frequency resources are overlapping RBs between RBs of the at least one indicated interlace index and the AV-RBs of the single subband;
    if the at least one subband index corresponds to two or more specific SB, the allocated frequency resources are determined by:
      a for any two contiguous SB (m, m+1) among the two or more specific SB, converting into AV-RB any PV-RB located between the last AV-RB of the first contiguous SB (m) and the first AV-RB of the second contiguous SB (m+1);
      determining the allocated frequency resources as overlapping RBs between RBs of the at least one indicated interlace index and the AV-RBs of the two or more specific SB A third object of the present disclosure is a method for allocating frequency resources in a wideband system for configured grant PUSCH transmission, performed by a user equipment, wherein the wideband system comprises a bandwidth part (BWP) containing a plurality of subbands (N; SB0, SB1), each subband (SB) being formed by resource blocks (RB), the method comprises the steps of:
  configuring an interlace structure according to the first object;
  obtaining at least one interlace index (#i) and at least one SB index (SBj);
  obtaining a mode indication;
  determining the frequency resources based on the indicated mode, the at least one interlace index, the at least one SB index and the interlace structure, such that:
    if the mode indication indicates that transmission over multiple subbands simultaneously is allowed, the allocated frequency resources are determined by:
      for any two contiguous SB (m, m+1) among the two or more specific SB, converting into AV-RB any PV-RB located between the last AV-RB of the first contiguous SB (m) and the first AV-RB of the second contiguous SB (m+1);
      determining the allocated frequency resources as overlapping RBs between RBs of the at least one indicated interlace index and the AV-RBs of the two or more specific SB;
    if the mode indication indicates that transmission over multiple subbands simultaneously is not allowed, the allocated frequency resources are determined by:
      for each indicated subband, the allocated frequency resources are overlapping RBs between the RBs of the at least one indicated interlace index and the AV-RBs of the at least one indicated subbands.

A fourth object of the present disclosure is a user equipment (UE), operable for configuring an interlace structure in a wideband system, the user equipment comprising one or more processors configured to control the execution of the method defined in the first, second or third object.

A fifth object of the present disclosure is a computer readable medium comprising program instructions for causing a user equipment to perform the steps of the method according to the first, second or third object.

BRIEF DESCRIPTION OF DRAWINGS

The appended drawings required in description of embodiments or the prior art will be briefly described below.

DESCRIPTION OF EMBODIMENTS

In the following disclosure, we will present several examples of interlace resource structure configuration and frequency resource allocation of such interlace resource structure.

Figure 1:
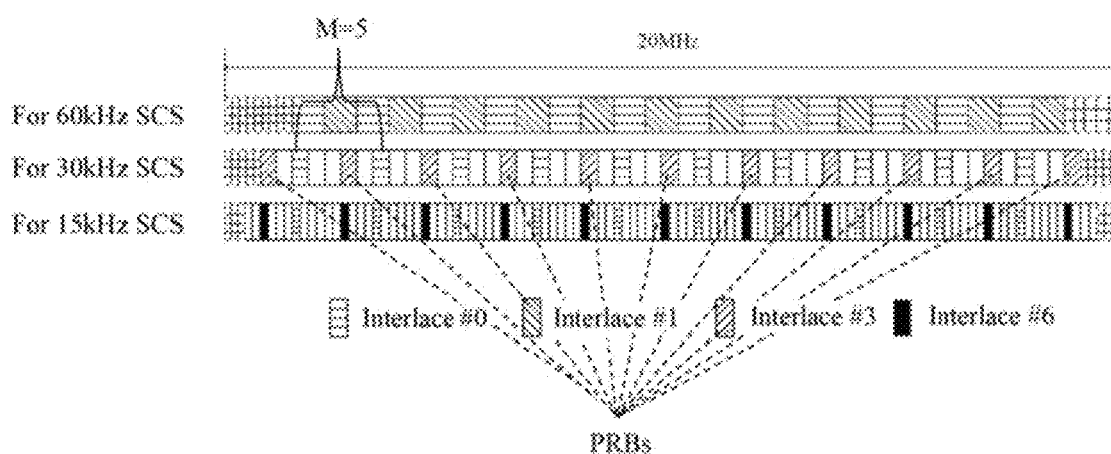
FIG. 1 shows an example of an interlaced structure.
Figure 2:
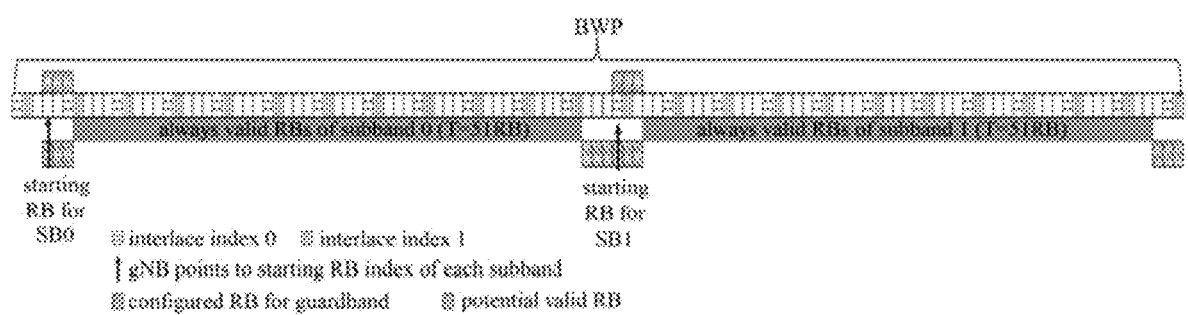
FIG. 2 shows an example of an interlace resource structure in the case that the interlace is defined within a BWP.

Example 1: Interlace Resource Structure with an Interlace Defined within a BWP As shown in FIG. 2, the UE determines the interlace resource structure in the case that the interlace is defined within a BWP as explained below.

In this example, the interlace is defined within the BWP and the UE receives an indication about the starting position of the first RB of the interlace index 0. Note that if no indication is received by the UE, the starting RB can be pre-defined as for example the first RB index of the BWP. In this example we assume the starting RB is the first RB of the BWP.

Then the UE will determine the interlace structure based on a pre-defined value of interlace spacing A, which is depending on the subcarrier space. In this example, we have taken M=5. Thus, the UE needs to define 5 interlaces from index 0 to 4. For interlace index j, j=0 . . . M−1, counting from the first RB index of the interlace 0+i up to the last RB of the BWP, every two consecutive RBs have an interval of M RBs.

The UE receives another indication about the starting RB position of each subband (SS-RB). In this example, we have two subbands (SB0, SB1), thus the UE will receive the indication about two starting RB (SS-RB) positions. This can be achieved by individual indication for each of the subbands, or by only indicating the starting RB position for the first subband (SB0), the other position (for the second subband SB1) being derived by the first position plus a configured duration.

Then the UE is informed by the network about the guardband duration for each subband. In this example, the duration is 3 RBs for both subband 0 and subband1. However, the guarbband duration might not always be the same among different subbands. The guardband starts from the starting RB position of each subband.

Then the UE determines the always-valid RB (AV-RB) of each subband by counting a pre-defined T RBs from the first RB after the guardband. In this example, we assume the pre-defined T=51 value corresponding to a subcarrier spacing of 30 KHz. T should be varying according to different subcarrier spacing.

Lastly, the UE determines the potential-valid RB (PV-RB) by counting all the RBs, other than the always-valid RBs, from the starting RB position of each subband up to the last RB before the starting RB position of the next subband.

Example 2: Allocated Frequency Resources in the Case that the Interlace is Defined within a BWP As shown in FIGS. 3A-3B, the UE determines the allocated frequency resources in the case that the interlace is defined with a BWP as explained below.

Figure 3A:
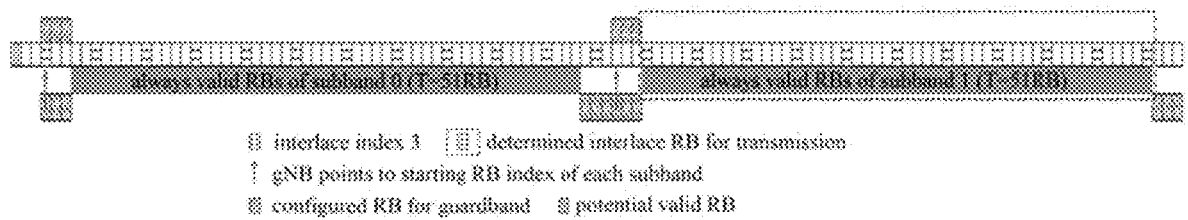
FIGS. 3A-3B show examples of the allocated frequency resources in the case that the interlace is defined within a BWP.

In this example shown in FIG. 3A, the UE receives the frequency resource allocation indication from the network, i.e. interlace index=3 and subband index=1. This means that there is only one subband indicated, thus, the UE will determine the allocated frequency resource as the overlapped RB of the interlace index 3 and the always-valid RBs of the subband 1.

Figure 3B:
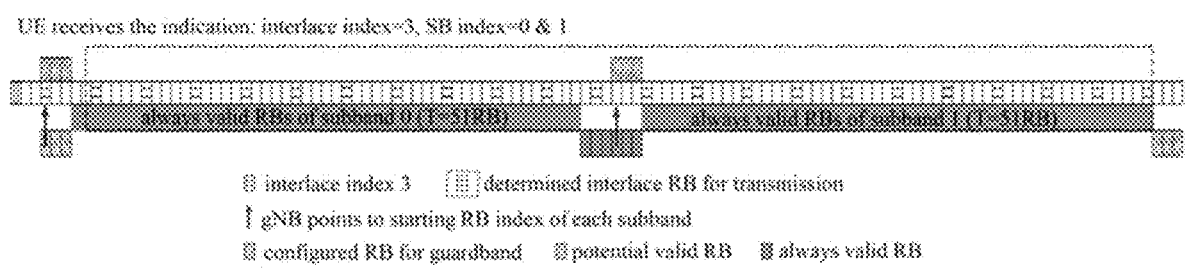

In this example shown in FIG. 3B, if the network indicates both subbands 0 and 1. Since they are contiguous subbands, the UE will turn the potential-valid RBs between the last RB of the always-valid RB of subband 0 and the first RB of the always-valid RB of subband 1 to the always-valid RB. Then the UE will determine the allocated frequency resources as the overlapped RB of the interlace index 3 and the always valid RBs of the subbands 0 and 1.

Figure 4:
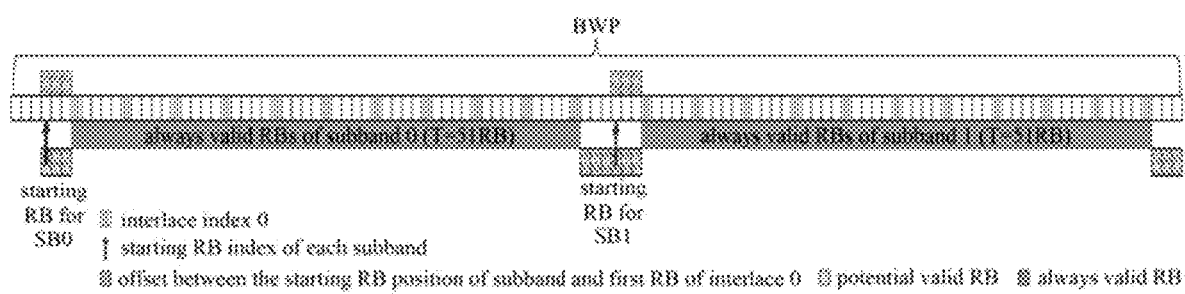
FIG. 4 shows an example of an interlace resource structure in the case that the interlace is defined within a subband.

Example 3: Interlace Resource Structure with an Interlace Defined within a Subband As shown in FIG. 4, the UE determines the interlace resource structure in the case that the interlace is defined within a subband as explained below.

In this example, the interlace is defined within the subband and the UE receives an indication about the starting position of the first RB of the interlace index 0 of each subband, and the offset between the first RB position and the starting RB position of the subband. Once one position and the relative offset are known, the other positions can be derived.

In this example, we assume that the network indicates the subband starting RB position and offset, then the first RB position of interlace 0 in each subband can be derived. Also it is to note that to indicate the starting RB position of each subband, the network can only indicate the starting RB position for the first subband, the other positions being derived by the first position plus a configured duration.

Then the UE can determine the interlace structure based on a pre-defined value M=5, which is further depending on the subcarrier space. Thus, the UE needs to define 5 interlaces from index 0 to 4. For interlace index j, j=0 . . . M−1, counting from the first RB index of the interlace (Wi up to the last RB before the first RB of the interlace 0 of the next subband, every two consecutive RBs have an interval of M RBs.

Then the UE determines the always-valid RB of each subband by counting a pre-defined T RBs from the first RB of interlace 0 of the concerned subband. In this example, we assume the pre-defined T=51. T should be varying according to different subcarrier spacing.

Lastly, the UE determines the potential-valid RB by counting all the RBs, other than the always valid RBs, from the starting RB position of each subband up to the last RB before the starting RB position of the next subband.

Example 4: Allocated Frequency Resources in the Case that the Interlace is Defined within a Subband As shown in FIGS. 5A-5B, the UE determines the allocated frequency resources in the case that the interlace is defined with a subband as explained below.

Figure 5A:
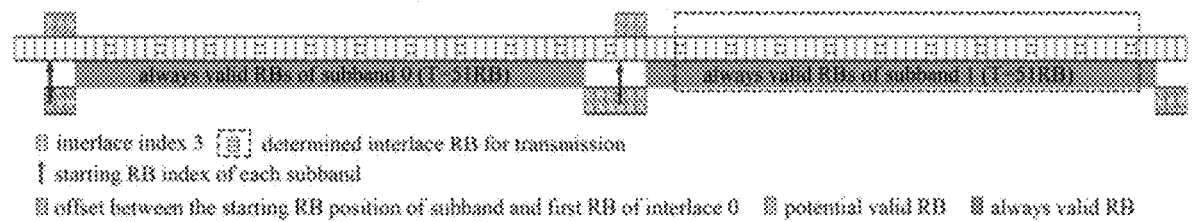
FIGS. 5A-5B show examples of the allocated frequency resources in the case that the interlace is defined within a subband.

In this example as shown in FIG. 5A, UE receives the frequency resource allocation indication from the network, i.e. interlace index=3 and subband index=1. This means that there is only one subband is indicated, thus, the UE will determine the allocated frequency resource as the overlapped RB of the interlace index 3 and the always valid RBs of the subband 1

Figure 5B:
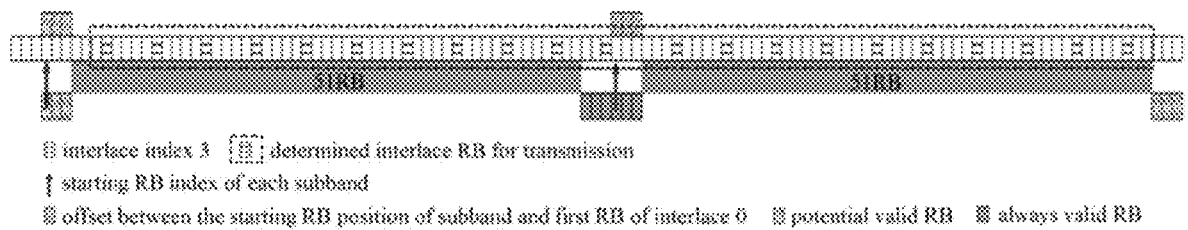

In this example as shown in FIG. 5B, if the network indicates both subband 0 and 1. Since they are contiguous subbands, the UE will turn the potential-valid RBs between the last RB of the always-valid RB of subband 0 and the first RB of the always-valid RB of subband 1 to the always-valid RB. Then the UE will determine the allocated frequency resources as the overlapped RB of the interlace index 3 and the always valid RBs of the subbands 0 and 1.

Example 5: Configured Grant PUSCH Frequency Resource Allocation

In the configured grant PUSCH transmission, the UE will be configured with frequency resource allocation. In our example, the network can configure two modes. In mode 1: the network will configure multiple subbands, but only one of the subbands can be used for transmission. Thus, the UE can pick any subband according to the LBT outcomes. In this case, even though the network indicates multiple subband index, the UE will consider one subband transmission case.

On the other hand, if the network configures the mode 2, it means that UE can transmit multiple subbands simultaneously. Thus, the frequency resource determination should consider multiple subbands.

LIST OF ABBREVIATIONS IN THE DESCRIPTION AND DRAWINGS

| Acronyms | Full name |
|---|---|
| LTE | Long Term Evolution |
| LTE-A | Advanced long term evolution |
| NR | New Radio |
| NR-U | New Radio-unlicensed |
| BS | Base-station |
| UE | User Equipment |
| PUCCH | Physical Uplink Control CHannel |
| PUSCH | Physical Uplink Shared CHannel |
| UCI | UPlink control information |
| LET | Listen Before Talk |
| AV-RB | Always-valid Resonite Block |
| PV-RB | Potential-valid Resource Block |
| SS-RB | Starting Subband Resource Block |
| RB | Resource Block |
| BWP | Banwidth Part |
| SB | SubBand |
| GB | GuardBand |

In the above description, the mobile telecommunication system is a 5G mobile network comprising a 5G NR access network. The present example embodiment is applicable to NR in unlicensed spectrum (NR-U). The present disclosure can be applied to other mobile networks, in particular to mobile network of any further generation cellular network technology (6G, etc.).

The above is only a specific implementation manner of the present disclosure, the protection scope of the present disclosure is not limited thereto, and changes or substitutions that can easily be thought of by those skilled in the art within the technical scope disclosed in the present disclosure should be covered by the protection scope of the present disclosure. Therefore, the protection scope of the present disclosure should be subject to the protection scope of the claims.

The various embodiments/examples, aspects and features, if any, described in this specification that do not fall under the scope of the independent claims are to be interpreted as examples useful for understanding various embodiments of the disclosure.

What is claimed is:

1. A method for configuring an interlace structure in a wideband system, performed by a user equipment, wherein the wideband system comprises a bandwidth part (BWP) containing a plurality of subbands (N; SB0, SB1), each subband (SB) being formed by resource blocks (RB), the method comprises the steps of:

obtaining for each SB within the BWP, at least two structure indications related to two structure parameters out of the three following structure parameters:
  a starting subband RB (SS-RB) defined as the first RB of a subband;
  a guardband (GB) defined as one or several consecutive RB starting from the SS-RB;
  a starting always-valid RB (AV-RB) defined as the first RB after the guardband ends;

obtaining a subcarrier spacing indication related to a subcarrier spacing defining a pre-defined number (T) of RB forming an interlace and an interlace spacing (M) between two RB with a same interlace index;

obtaining at least one interlace index indication related to one location of an RB of interlace index i-th, i being either pre-defined or indicated with the location;

configuring the interlace structure by:
  determining all interlaces within the BWP based on the at least one interlace index indication and the subcarrier spacing indication;
  and, for each SB, based on the at least two structure indications, by:
    determining a set of AV-RB starting from the starting AV-RB and containing a number of consecutive RB corresponding to the pre-defined number (T) of RB forming an interlace;
    determining a set of potential-valid RB (PV-RB) as all RB other than a determined AV-RB.

2. The method for configuring an interlace structure according to claim 1, wherein an indication related to the SS-RB is the SS-RB position for each SB or the SS-RB position for a first SB within the BWP along with a duration indication of the SB contained in the BWP.

3. The method for configuring an interlace structure according to claim 1, wherein an indication related to the guardband (GB) is the guardband duration corresponding to a number of consecutive RB, for each SB.

4. The method for configuring an interlace structure according to claim 1, wherein an indication related to the starting AV-RB is the AV-RB position for each SB or the AV-RB position for a first SB within the BWP along with a duration indication of the SB contained in the BWP.

5. The method for configuring an interlace structure according to claim 1, wherein the interlaces are defined within the BWP across all contained subbands (N; SB0, SB1) and the at least one interlace index indication is a single interlace index indication corresponding to one location of an RB of interlace index i-th within the BWP.

6. The method for configuring an interlace structure according to claim 5, wherein the interlace index indication is the position of the first RB of the interlace index 0.

7. The method for configuring an interlace structure according to claim 1, wherein the interlaces are defined within a subband and the at least one interlace index indication contains two interlace index indications:
   a first interlace index indication corresponding to one location of an RB of interlace index i-th within one SB; and
   a second interlace index indication corresponding to an offset between a first interlace index indication location and the SS-RB of a corresponding SB.

8. The method for configuring an interlace structure according to claim 7, wherein the first interlace index indication is the position of the first RB of the interlace index 0.

9. The method for configuring an interlace structure according to claim 1, wherein, within one specific SB, the set of PV-RB is defined as all RB other than the determined AV-RB from the SS-RB of the specific SB to the SS-RB of the next SB to the specific SB.

10. A method for allocating frequency resources in a wideband system, performed by a user equipment, wherein the wideband system comprises a bandwidth part (BWP) containing a plurality of subbands (N; SB0, SB1), each subband (SB) being formed by resource blocks (RB), the method comprises the steps of:
   configuring an interlace structure according to claim 1;
   obtaining at least one interlace index (#i) and at least one SB index (SBj);
   determining the frequency resources based on the at least one interlace index, the at least one SB index and the interlace structure, such that:
      if the at least one SB index corresponds to a single SB, allocated frequency resources are overlapping RBs between RBs of at least one indicated interlace index and AV-RBs of the single SB;
      if the at least one SB index corresponds to two or more SB, the allocated frequency resources are determined by:
         for any two contiguous SB (m, m+1) among the two or more SB, converting into AV-RB any PV-RB located between the last AV-RB of the first contiguous SB (m) and the first AV-RB of the second contiguous SB (m+1);
         determining the allocated frequency resources as overlapping RBs between RBs of the at least one indicated interlace index and the AV-RBs of the two or more SB.

11. A user equipment (UE), operable for configuring an interlace structure in a wideband system, wherein the wideband system comprises a bandwidth part (BWP) containing a plurality of subbands (N; SB0, SB1), each subband (SB) being formed by resource blocks (RB), the user equipment comprising one or more processors, a memory, and a computer program;
   wherein the computer program is stored in the memory and is configured to be executed by the processor, and the computer program comprises instructions to enable the one or more processors to:
      obtain for each SB within the BWP, at least two structure indications related to two structure parameters out of the three following structure parameters:
         a starting subband RB (SS-RB) defined as the first RB of a subband;
         a guardband (GB) defined as one or several consecutive RB starting from the SS-RB;
         a starting always-valid RB (AV-RB) defined as the first RB after the guardband ends;
      obtain a subcarrier spacing indication related to a subcarrier spacing defining a pre-defined number (T) of RB forming an interlace and an interlace spacing (M) between two RB with a same interlace index;
      obtain at least one interlace index indication related to one location of an RB of interlace index i-th, i being either pre-defined or indicated with the location;
      configure the interlace structure by:
         determining all interlaces within the BWP based on the at least one interlace index indication and the subcarrier spacing indication;
         and, for each SB, based on the at least two structure indications, by:
            determining a set of AV-RB starting from the starting AV-RB and containing a number of consecutive RB corresponding to the pre-defined number (T) of RB forming an interlace;
            determining a set of potential-valid RB (PV-RB) as all RB other than a determined AV-RB.

12. The user equipment according to claim 11, wherein an indication related to the SS-RB is the SS-RB position for each SB or the SS-RB position for a first SB within the BWP along with a duration indication of the SB contained in the BWP.

13. The user equipment according to claim 11, wherein an indication related to the guardband (GB) is the guardband duration corresponding to a number of consecutive RB, for each SB.

14. The user equipment according to claim 11, wherein an indication related to the starting AV-RB is the AV-RB position for each SB or the AV-RB position for a first SB within the BWP along with a duration indication of the SB contained in the BWP.

15. The user equipment according to claim 11, wherein the interlaces are defined within the BWP across all contained subbands (N; SB0, SB1) and the at least one interlace index indication is a single interlace index indication corresponding to one location of an RB of interlace index i-th within the BWP.

16. The user equipment according to claim 15, wherein the interlace index indication is the position of the first RB of the interlace index 0.

17. The user equipment according to claim 11, wherein the interlaces are defined within a subband and the at least one interlace index indication contains two interlace index indications:
   a first interlace index indication corresponding to one location of an RB of interlace index i-th within one SB; and
   a second interlace index indication corresponding to an offset between a first interlace index indication location and the SS-RB of a corresponding SB.

18. The user equipment according to claim 17, wherein the first interlace index indication is the position of the first RB of the interlace index 0.

19. The user equipment according to claim 11, wherein, within one specific SB, the set of PV-RB is defined as all RB other than the determined AV-RB from the SS-RB of the specific SB to the SS-RB of the next SB to the specific SB.

20. A non-transitory computer readable medium comprising program instructions for causing a user equipment to perform the steps of the method according to claim 1.

* * * * *